(12) United States Patent
Karube et al.

(10) Patent No.: US 8,801,039 B2
(45) Date of Patent: Aug. 12, 2014

(54) FUEL PUMP MOUNTING STRUCTURE OF SADDLE-RIDE-TYPE VEHICLE

(75) Inventors: Shinichi Karube, Wako (JP); Shinya Koyama, Wako (JP); Hiroyuki Sudo, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 244 days.

(21) Appl. No.: 13/372,279

(22) Filed: Feb. 13, 2012

(65) Prior Publication Data
US 2012/0228857 A1 Sep. 13, 2012

(30) Foreign Application Priority Data

Mar. 7, 2011 (JP) ................................. 2011-048643

(51) Int. Cl.
| | |
|---|---|
| *B60P 3/22* | (2006.01) |
| *B62J 37/00* | (2006.01) |
| *B62J 35/00* | (2006.01) |
| *F02M 37/00* | (2006.01) |

(52) U.S. Cl.
CPC *B62J 37/00* (2013.01); *B62J 35/00* (2013.01); *F02M 37/0076* (2013.01)
USPC .......................................................... 280/833

(58) Field of Classification Search
CPC ...... B60P 3/22; F02M 37/04; F02M 37/0076; B62J 35/00; B62J 39/00
USPC ............... 280/833, 835; 137/565.01; 123/509
See application file for complete search history.

(56) References Cited

U.S. PATENT DOCUMENTS

| | | | | |
|---|---|---|---|---|
| 7,275,523 | B2 * | 10/2007 | Kimura et al. | 123/509 |
| 8,584,339 | B2 * | 11/2013 | Mbog et al. | 29/464 |
| 2008/0245423 | A1 * | 10/2008 | Noda et al. | 137/565.01 |

FOREIGN PATENT DOCUMENTS

| | | | | |
|---|---|---|---|---|
| EP | 2221467 A2 * | 8/2010 | | F02M 37/10 |
| JP | 2007-15468 A | 1/2007 | | |

\* cited by examiner

*Primary Examiner* — Joseph M Rocca
*Assistant Examiner* — Daniel Yeagley
(74) *Attorney, Agent, or Firm* — Birch, Stewart, Kolasch & Birch, LLP (57) ABSTRACT

A fuel pump mounting structure of a saddle-ride-type vehicle that can enhance the degree of freedom in the shape of a fuel tank with the construction where a fuel pump is arranged in the inside of the saddle-type fuel tank that straddles a main frame. A first opening portion is formed in a tank bottom plate of a fuel tank, and a mounting arm which closes the first opening portion by one end thereof and supports the fuel pump by the other end thereof is arranged in the inside of the fuel tank, the mounting arm extends along a vehicle widthwise direction toward a gap SA formed between a straddling bottom portion of the fuel tank that straddles a main frame and a tank side wall of the fuel tank, and supports the fuel pump in the inside of the gap SA.

16 Claims, 5 Drawing Sheets

FUEL PUMP MOUNTING STRUCTURE OF SADDLE-RIDE-TYPE VEHICLE

CROSS-REFERENCE TO RELATED APPLICATIONS

The present application claims priority under 35 USC 119 to Japanese Patent Application No. 2011-048643 filed Mar. 7, 2011 the entire contents of which are hereby incorporated by reference.

BACKGROUND OF THE INVENTION

1. Field of the Invention

The present invention relates to the fuel pump mounting structure of a saddle-ride-type vehicle having a fuel pump inside of a saddle-type fuel tank that straddles a main frame.

2. Description of Background Art

A motorcycle is known wherein a fuel pump is arranged inside of a fuel tank which stores fuel therein. This type of fuel tank is an in-tank pump type. This motorcycle includes a single main frame which extends rearwardly from a head pipe. A saddle-type fuel tank is arranged on the main frame with a fuel pump being mounted on either one of a pair of left and right tank portions of the fuel tank. See, for example, JP-A-2007-15468.

However, in the conventional construction, the fuel pump is directly mounted on a bottom plate of the fuel tank. Thus, it is necessary to form an opening portion at a position where the fuel pump is mounted. This opening portion requires an opening area which allows the insertion of the fuel pump. In addition, it is necessary to form the opening portion in a flat shape for mounting a flange portion which is mounted on the fuel pump. Accordingly, bottom plates of left and rightP tank portions become large-sized and flat leading to a large-size fuel tank whereby the degree of freedom in shape is limited.

Further, to straddle the main frame, a portion of the saddle-type fuel tank that straddles the main frame is formed of an upwardly raised bottom. Thus, a rear space in the inside of the tank is liable to become narrow. Accordingly, to arrange the fuel pump in a rear portion in the inside of the tank, it is necessary to change the shape of the fuel tank.

SUMMARY AND OBJECTS OF THE INVENTION

The present invention has been made under the above-mentioned circumstances. It is an object of an embodiment of the present invention to provide the fuel pump mounting structure of a saddle-ride-type vehicle which can enhance the degree of freedom in the shape of a fuel tank with a construction wherein a fuel pump is arranged in the inside of the saddle-type fuel tank which straddles the main frame.

To overcome the above-mentioned drawbacks, an embodiment of the present invention is directed to a fuel pump mounting structure of a saddle-ride-type vehicle including a vehicle body frame (2) having a main frame (10) which extends rearwardly; a saddle-type fuel tank (100) which is mounted on the main frame (10) in a state where the fuel tank (100) straddles the main frame (10); and a fuel pump (151) which is arranged in the inside of the fuel tank (100), wherein an opening portion (115) is formed in a bottom plate (111) of the fuel tank (100). A mounting arm (161), that closes the opening portion (115) by one end thereof and supports the fuel pump (151) by the other end thereof, is arranged in the inside of the fuel tank (100). The mounting arm (161) extends along a vehicle widthwise direction toward a gap formed between a straddling bottom portion (112) of the fuel tank (100) which straddles the main frame (10) and a side wall (121B) of the fuel tank (100), and supports the fuel pump (151) in the inside of the gap.

Due to such a construction, the mounting arm, which closes the opening portion formed in the tank bottom plate by one end thereof and supports the fuel pump by the other end thereof, is arranged in the inside of the fuel tank, the mounting arm extends along the vehicle widthwise direction toward the gap formed between the straddling bottom portion of the fuel tank which straddles the main frame and the side wall of the fuel tank, and supports the fuel pump in the inside of the gap. Accordingly, there is no restriction such as the restriction where it is necessary to form a large opening in a deepest portion of the tank bottom plate or the restriction where it is necessary to form a flat portion on the tank bottom plate. Thus, it is possible to enhance the degree of freedom in the shape of the fuel tank with the construction where the fuel pump is arranged in the inside of the saddle-type fuel tank which straddles the main frame.

In the above-mentioned construction, the mounting arm (161) may have a flange portion (162) which closes the opening portion (115) at one end thereof, and a pump support portion (163) that supports the fuel pump (151) at the other end thereof, and the flange portion (162) and the pump support portion (163) may be connected to each other by a bent arm (164) which is bent in an upwardly projecting manner as viewed in a front view. Due to such a construction, the structure of the mounting arm becomes simple. Thus, the mounting arm can be easily manufactured.

Further, in the above-mentioned construction, the opening portion (115) may be formed in the straddling bottom portion (112), and the mounting arm (161) may extend upwardly from the opening portion (115) and, thereafter, may be bent toward the gap along an outer wall of the fuel tank (100). Due to such a construction, the fuel pump can be easily moved to the gap by moving the mounting arm along the outer wall of the tank and hence, a mounting and removal operation of the fuel pump and the mounting arm can be easily performed.

Further, in the above-mentioned construction, the fuel pump (151) may be positioned below one end of the mounting arm (161), and may be supported in a state where a longitudinal axis of the fuel pump (151) extends in a rearwardly and downwardly inclined manner along a longitudinal direction of a vehicle body. Due to such a construction, a widthwise space necessary for the arrangement of the fuel pump can be made small. Thus, the fuel pump can be arranged compactly. Further, the rear lower portion of the fuel pump can be arranged close to the tank bottom plate and hence, it is possible to allow the fuel pump to take the pump arrangement suitable for the fuel tank where the rear lower portion of the fuel tank forms the deepest portion of the tank.

Further, in the above-mentioned construction, the mounting arm (161) may be formed into a recessed shape in cross section indented rearwardly and downwardly, and a fuel feed pipe (152) which is connected to the fuel pump (151) may be housed in the inside of a recessed portion (164D) formed by the recessed shape in cross section. Due to such a construction, the fuel feed pipe can be held without using a dedicated support member. Further, the mounting arm is made to function as a reserve when a vehicle body turns.

Further, in the above-mentioned construction, the opening portion (115) of the fuel tank (100) may be offset to a side opposite to the fuel pump (151) with respect to the widthwise center of the fuel tank (100). Due to such a construction, the arm can be elongated while ensuring mountability of the mounting arm.

Further, in the above-mentioned construction, a rider's seat (57) may be provided behind the fuel tank (100), and an upper surface of a rear portion of the fuel tank (100) may be inclined rearwardly and downwardly thus forming a seat mounting recessed portion (100A) in which a front portion of the rider's seat (57) enters, a bottom surface of a rear portion of the fuel tank (100) may be formed low compared to a bottom surface of a front portion of the fuel tank (100), and the mounting arm (161) may support the fuel pump (151) below the seat mounting recessed portion (100A). Due to such a construction, even in a case where a rear space of the fuel tank is narrow and there is a restriction that it is necessary to arrange the fuel pump in the inside of the narrow rear space from a viewpoint of fuel suction property, the degree of freedom in shape of the fuel tank can be enhanced. Thus, the fuel pump can be arranged compactly while preventing the fuel tank from becoming large-sized and also ensuring fuel suction property.

Further, in the above-mentioned construction, the opening portion (115) of the fuel tank (100) may be formed into an elongated hole shape where a longitudinal size is set larger than a widthwise size. Due to such a construction, the fuel pump can be easily inserted into the space in the longitudinal direction.

The mounting arm which closes the opening portion formed in the tank bottom plate by one end thereof and supports the fuel pump by the other end thereof is arranged in the inside of the fuel tank, the mounting arm extends along the vehicle widthwise direction toward the gap formed between the straddling bottom portion of the fuel tank which straddles the main frame and the side wall of the fuel tank, and supports the fuel pump in the inside of the gap. Accordingly, there is no restriction such as a restriction where it is necessary to form a large opening in a deepest portion of the tank bottom plate or a restriction where it is necessary to form a flat portion on the tank bottom plate. Thus, it is possible to enhance the degree of freedom in the shape of the fuel tank with the construction where the fuel pump is arranged in the inside of the saddle-type fuel tank which straddles the main frame.

The mounting arm has a flange portion which closes the opening portion at one end thereof, and the pump support portion which supports the fuel pump at the other end thereof, and the flange portion and the pump support portion are connected to each other by a bent arm which is bent in an upwardly projecting manner as viewed in a front view. Accordingly, the structure of the mounting arm becomes simple. Thus, the mounting arm can be easily manufactured.

The above-mentioned opening portion is formed in the straddling bottom portion, and the mounting arm extends upwardly from the opening portion and, thereafter, is bent toward the gap along an outer wall of the fuel tank. Accordingly, the fuel pump can be easily moved to the gap by moving the mounting arm along the outer wall of the tank. Thus, a mounting and removal operation of the fuel pump and the mounting arm can be easily performed.

The fuel pump is positioned below one end of the mounting arm, and is supported in a state where a longitudinal axis of the fuel pump extends in a rearwardly and downwardly inclined manner along a longitudinal direction of the vehicle body. Accordingly, a widthwise space necessary for the arrangement of the fuel pump can be made small. Thus, the fuel pump can be arranged compactly. Further, the rear lower portion of the fuel pump can be arranged close to the tank bottom plate. Thus, it is possible to allow the fuel pump to take the pump arrangement suitable for the fuel tank where the rear lower portion of the fuel tank forms the deepest portion of the tank.

The mounting arm is formed into a recessed shape in cross section indented rearwardly and downwardly, and the fuel feed pipe which is connected to the fuel pump is housed in the inside of a recessed portion formed by the recessed shape in cross section. Accordingly, the fuel feed pipe can be held without using a dedicated support member. Further, the mounting arm is made to function as a reserve when a vehicle body turns.

By offsetting the opening portion of the fuel tank to the side opposite to the fuel pump with respect to the widthwise center of the fuel tank, the arm can be elongated while ensuring mountability of the mounting arm.

A rider's seat is arranged behind the fuel tank, and the upper surface of the rear portion of the fuel tank is inclined rearwardly and downwardly thus forming the seat mounting recessed portion in which the front portion of the rider's seat enters, the bottom surface of the rear portion of the fuel tank is formed low compared to the bottom surface of the front portion of the fuel tank, and the mounting arm supports the fuel pump below the seat mounting recessed portion. Accordingly, even in a case where a rear space of the fuel tank is narrow and there is a restriction that it is necessary to arrange the fuel pump in the inside of the narrow rear space from a viewpoint of fuel suction property, the degree of freedom in shape of the fuel tank can be enhanced. Thus, the fuel pump can be arranged compactly while preventing the fuel tank from becoming large-sized and also ensuring fuel suction property.

By forming the opening portion of the fuel tank in an elongated hole shape where a longitudinal size is set larger than a widthwise size, the fuel pump can be easily inserted into the space in the longitudinal direction.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Hereinafter, one embodiment of the present invention is explained in conjunction with the drawings. Here, in the explanation, the directions such as the frontward direction, the rearward direction, the leftward direction, the rightward direction, the upward direction and the downward direction are equal to the corresponding directions of a vehicle body unless otherwise specified. Further, in the respective drawings, symbol FR indicates the frontward direction of the vehicle body, symbol UP indicates the upward direction of the vehicle body, and symbol R indicates the rightward direction of the vehicle body.

Figure 1:
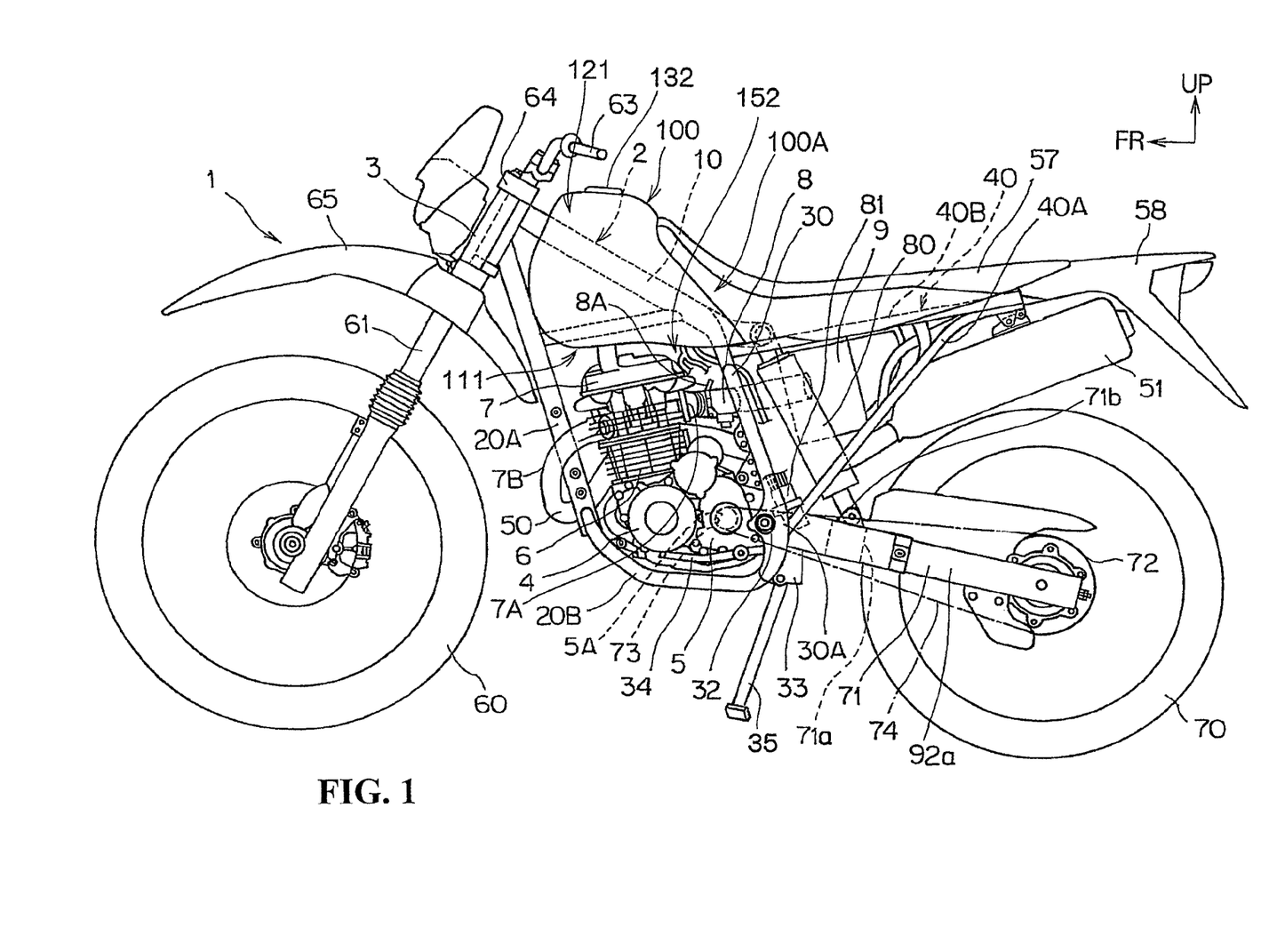
FIG. 1 is a side view of a motorcycle according to an embodiment of the present invention.

FIG. 1 is a side view of a motorcycle according to an embodiment of the present invention.

This motorcycle 1 is an off-road-type vehicle that can travel on a rough terrain such as a muddy terrain. In the motorcycle 1, a front wheel 60 and a rear wheel 70 are formed of a large-diameter wheel, a suspension stroke in the longitudinal direction is long, and a ground clearance is set high.

A vehicle body frame 2 of the motorcycle 1 includes a single main frame 10 which extends rearwardly and downwardly from a head pipe 3, a down frame 20A which extends downwardly from the head pipe 3, a pair of left and right lower frames 20B, 20B which extends rearwardly from a lower portion of the down frame 20A, a pair of left and right center frames 30, 30 which connects a rear end of the main frame 10 and rear ends of the lower frames 20B, 20B, and rear frames 40, 40 which are connected to the center frames 30, 30.

The rear frames 40 include a pair of left and right sub frames 40A, 40A which extends rearwardly and upwardly from lower portions of the center frames 30, 30, and a pair of left and right seat rails 40B, 40B which extends rearwardly from upper portions of the center frames 30, 30. Rear ends of the sub frames 40A, 40A and rear ends of the seat rails 40B, 40B are respectively connected to each other, a rider's seat 57 is supported on the seat rails 40B, 40B, and a rear fender 58 is supported on a rear portion of the rider's seat 57. In FIG. 1, for easing the explanation, side covers and shrouds that cover outer side portions of the vehicle body are omitted.

The head pipe 3 rotatably supports a pair of left and right front forks 61 that pivotally supports the front wheel 60. Upper portions of the front forks 61 and an upper portion of the head pipe 3 are fixed to a top bridge 64 on which a steering handle 63 is mounted. Further, a front fender 65 that covers the front wheel 60 from above is fixed to the front forks 61.

The center frames 30, 30 have bent portions 30A on a lower side thereof, and a pivot shaft 32 is mounted on the bent portions 30A in a penetrating manner in the vehicle widthwise direction. A swing arm 71 that pivotally supports the rear wheel 70 has a front end thereof pivotally supported on the pivot shaft 32 so that the swing arm 71 is swingably supported. A drive chain 74 extends between and wound around a sprocket 72 which is mounted on the rear wheel 70 and a sprocket 73 which is mounted on an output shaft 5A of an engine 4, and a drive force of the engine 4 is transmitted to the rear wheel 70 by way of the drive chain 74.

A cross member (not shown in the drawing) which connects the center frames 30, 30 to each other in the lateral direction is arranged below the bent portions 30A, a frame-side bracket 33 is mounted on the cross member, and a stand 35 is mounted on the frame-side bracket 33.

The swing arm 71 includes a pair of left and right arms 92a, 92a that extends rearwardly from the pivot shaft 32 and straddles the rear wheel 70. The left and right arms 92a, 92a are connected to each other by a cross frame 71a at portions thereof arranged in front of the rear wheel 70. A support portion 71b is mounted on an upper end of the cross frame 71a, and a lower portion of a rear shock absorber 80 is rotatably mounted on the support portion 71b. An upper portion of the rear shock absorber 80 is rotatably mounted on a cushion support portion formed on a rear portion of the main frame 10.

A gear change pedal 34 is arranged in front of the bent portions 30A and in the vicinity of a lower portion of the engine 4.

The engine 4 includes a crankcase 5, a cylinder block 6 which extends substantially upwardly from a front portion of the crankcase 5, and a cylinder head 7 which is connected to an upper portion of the cylinder block 6. The engine 4 is a single cylinder engine in which one cylinder is provided in the inside of the cylinder block 6.

An intake port 7A is formed in a back surface of the cylinder head 7, a throttle body 8 is connected to the intake port 7A, and an air cleaner box 9 that is positioned below the rider's seat 57 is connected to the throttle body 8. An injector (fuel injection device) 8A which injects fuel into the throttle body 8 is mounted on the throttle body 8, and a fuel feed pipe 152 which extends from a fuel pump 151 described later is connected to the injector 8A. The cylinder head 7, the throttle body 8, and the air cleaner box 9 are arranged on a substantially straight line for enhancing intake efficiency.

An exhaust port 7B is formed in a front surface of the cylinder head 7. An exhaust pipe 50 is connected to the exhaust port 7B, the exhaust pipe 50 extends frontwardly from the exhaust port 7B, is bent toward a right side of the cylinder head 7, and extends toward a rear side of the vehicle body on a right side of the vehicle body. An exhaust muffler 51 is connected to an extending end of the exhaust pipe 50.

A fuel tank 100 which reserves fuel therein is arranged on the main frame 10. The fuel tank 100 is a saddle-type fuel tank that straddles the main frame 10 from above, and is arranged between the head pipe 3 and the rider's seat 57 and above the cylinder head 7 of the engine 4.

Figure 2:
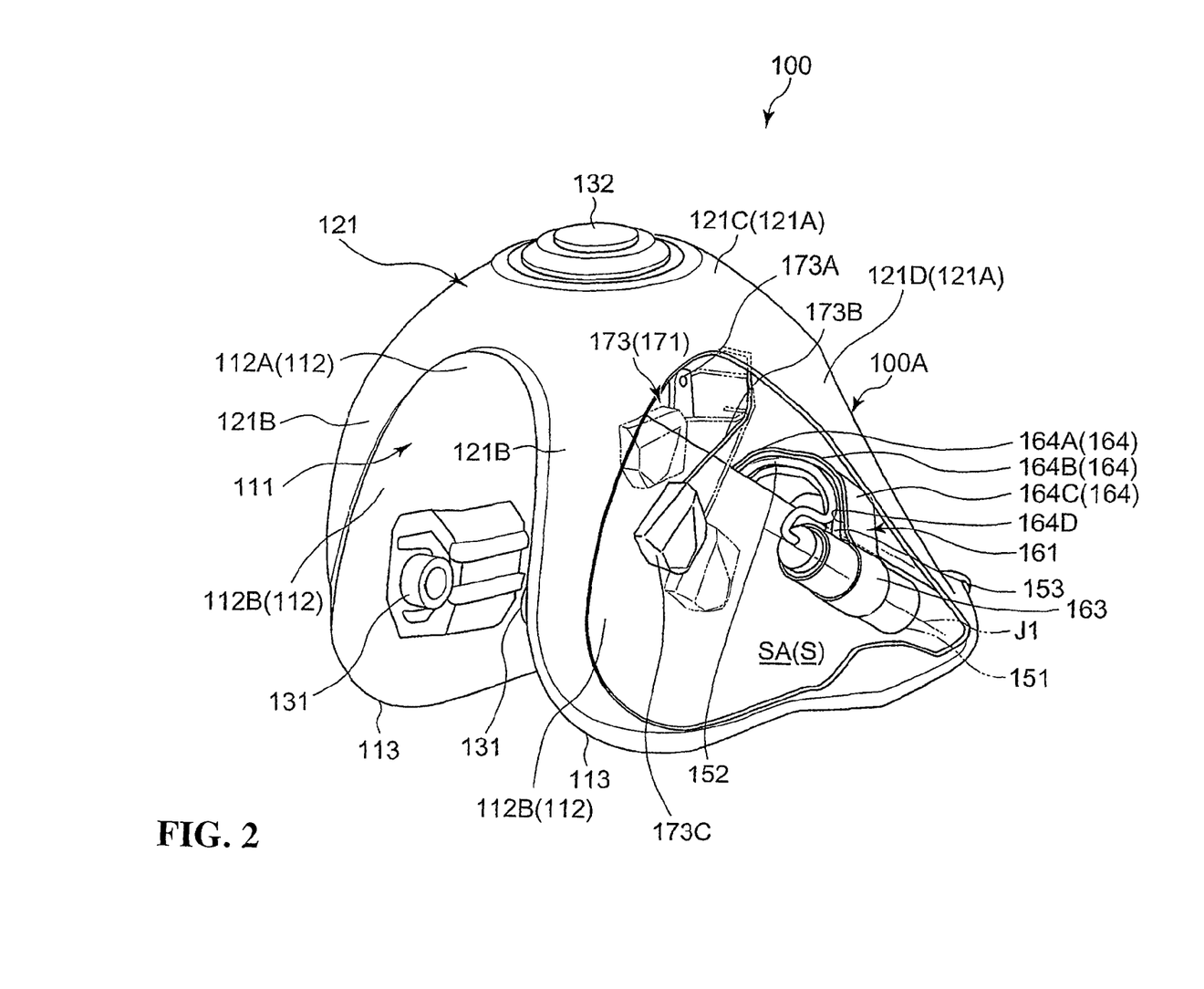
FIG. 2 is a perspective view of a fuel tank as viewed from an oblique frontward position.
Figure 3:
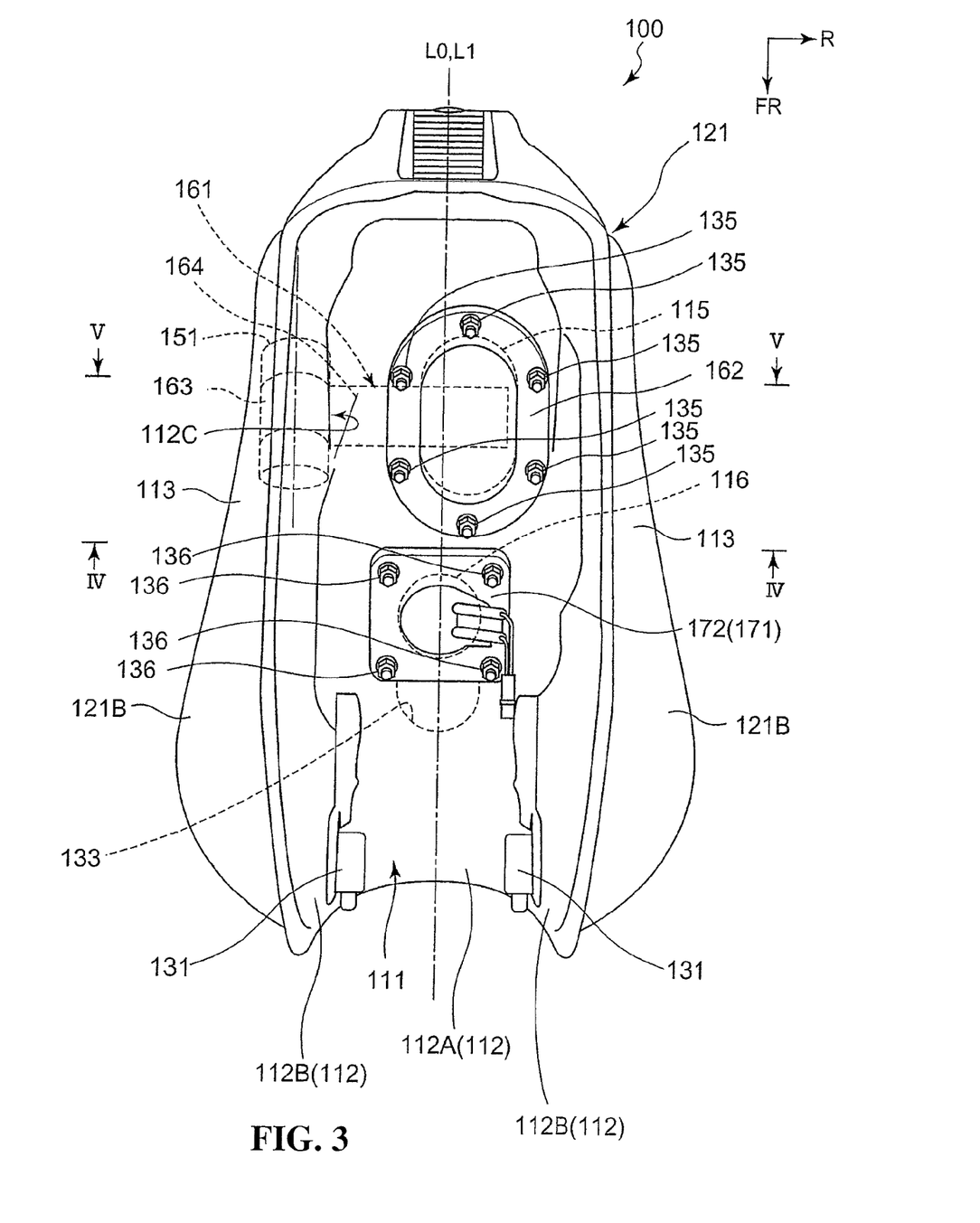
FIG. 3 is a view of the fuel tank as viewed from below.

FIG. 2 is a perspective view of the fuel tank 100 as viewed from an oblique frontward position, and FIG. 3 is a view of the fuel tank 100 as viewed from below. In FIG. 2, for easing the explanation, the inside of the fuel tank 100 is exposed by opening a part of the fuel tank 100. Further, FIG. 4 is a view showing a cross section taken along a line IV-IV in FIG. 3, and FIG. 5 is a view showing a cross section taken along a line V-V in FIG. 3.

As shown in FIG. 2 and FIG. 3, the fuel tank 100 includes a tank bottom plate 111 which straddles the main frame 10 from above and a tank outer wall 121 which covers the tank bottom plate 111 from above and defines a fuel space S between the tank outer wall 121 and the tank bottom plate 111, and the fuel tank 100 is constituted by joining the tank bottom plate 111 and the tank outer wall 121 to each other by welding or the like. The fuel tank 100 is a metal-made tank or a resin-made integrally-molded tank, and has a left and right symmetrical shape with respect to the center L0 in the vehicle widthwise direction.

Figure 4:
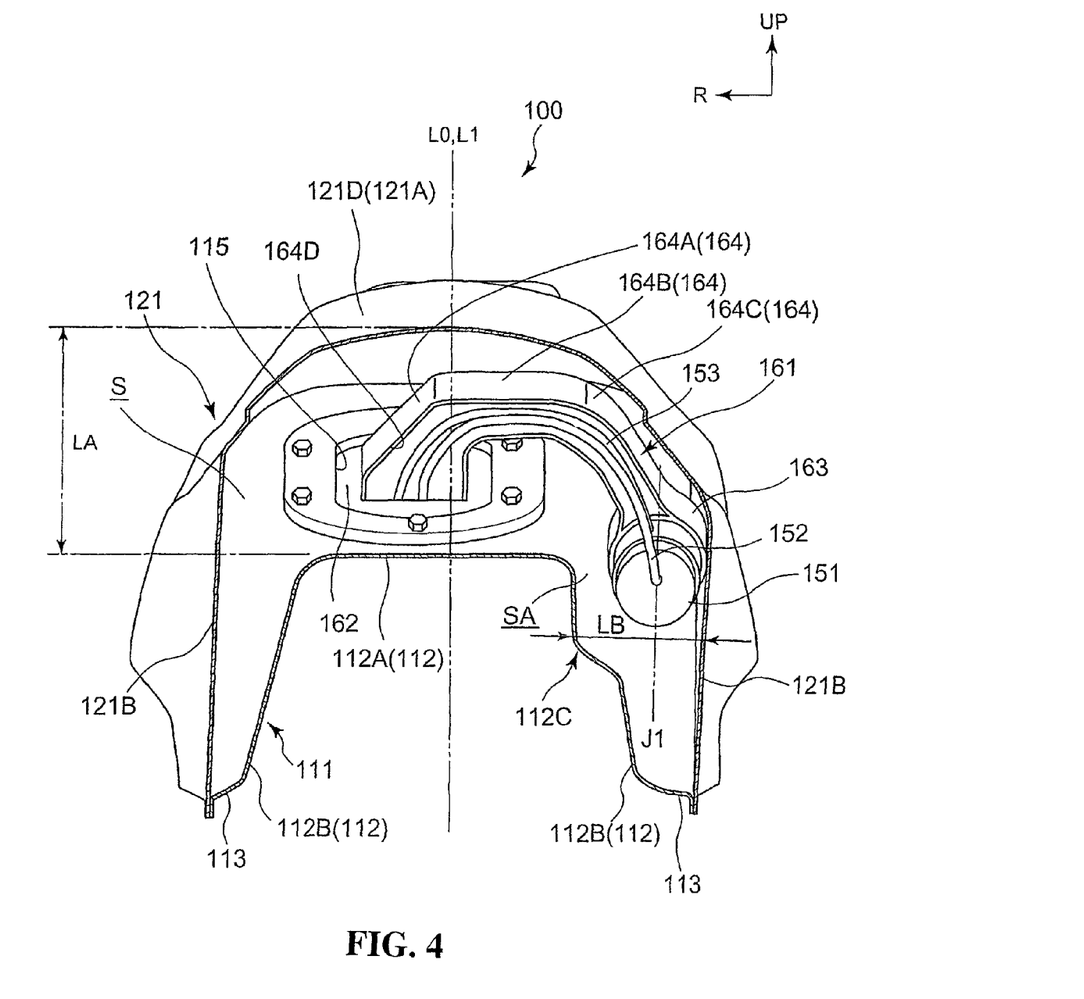
FIG. 4 is a cross-sectional view taken along a line IV-IV in FIG. 3.
Figure 5:
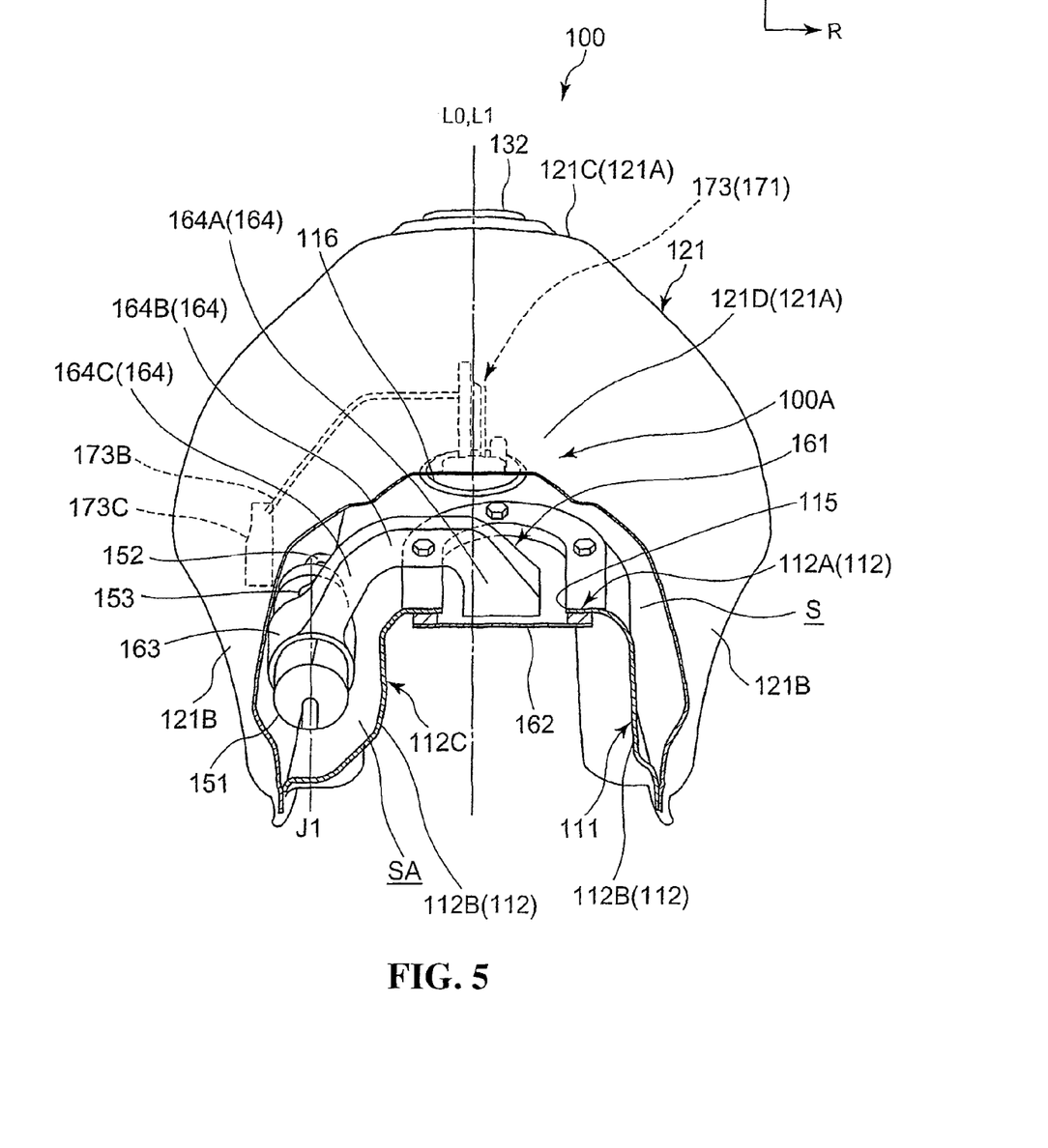
FIG. 5 is a cross-sectional view taken along a line V-V in FIG. 3.

As shown in FIG. 4 and FIG. 5, the tank bottom plate 111 includes a straddling bottom portion 112 having an inversely U-shape as viewed in a front view which bulges in an upwardly projecting manner at the center in the vehicle widthwise direction for straddling the main frame 10 from above and a pair of left and right outer bottom portions 113 which bulges leftwardly and rightwardly from the straddling bottom portion 112. The tank bottom plate 111 is formed of a single flat plate. The straddling bottom portion 112 includes a center plate portion 112A which extends in the longitudinal direction on the main frame 10 at the center of the fuel tank 100 in the vehicle widthwise direction; and a pair of left and right side plate portions 112B which extends downwardly from left and right ends of the center plate portion 112A.

As shown in FIG. 4 and FIG. 5, the center plate portion 112A has a plate shape extending horizontally as viewed from a front view. As shown in FIG. 2, the center plate portion 112A is formed into an inclined surface which is inclined rearwardly and downwardly along the inclination of the main frame 10 as viewed in a side view.

As shown in FIG. 4 and FIG. 5, the side plate portions 112B extend downwardly at the steep inclination close to the substantially vertical direction as viewed in a front view and, as shown in FIG. 2, extend in the longitudinal direction along the main frame 10 on left and right sides of the main frame 10, as gradually lower a vertical height thereof as the side plate portions 112B extend rearwardly, and connect the center plate portion 112A and a pair of left and right outer bottom portions 113 which differ from each other in height to each other. Further, positioning members 131 (see FIG. 3) that are used in mounting the fuel tank 100 on the main frame 10 are fixed to inner sides of the side plate portions 112B in the vehicle widthwise direction.

Further, as shown in FIG. 2, FIG. 4 and FIG. 5, the outer bottom portions 113 extend outwardly in the vehicle widthwise direction at the gentle inclination closer to the horizontal direction than the inclination of the side plate portions 112B as viewed in a front view and constitute the deepest portions of the fuel tank 100 in the vehicle widthwise direction. Further, in the fuel tank 100 having such a construction, the outer bottom portions 113 which constitute the lowermost surfaces of the tank bottom plate 111 are gradually lowered as the outer bottom portions 113 extend rearwardly, and a rear portion of the fuel tank constitutes a tank deepest portion (see FIG. 1).

As shown in FIG. 4, a tank outer wall 121 forms a tank outer surface having an inversely U-shape as viewed in a front view where a center portion in the vehicle widthwise direction bulges in an upwardly projecting manner and extending rearwardly. Due to such structure, an inversely U-shaped fuel space S that opens downwardly as viewed in a front view is formed between the tank outer wall 121 and the tank bottom plate 111. Further, the tank outer wall 121 is formed such that a front portion is set higher than a rear portion as viewed in a side view, and an oil supply port 133 (see FIG. 3) which is closeable by a fuel cap 132 (see FIG. 2) is formed in a center portion of the front portion in the vehicle widthwise direction.

The tank outer wall 121 includes a tank upper plate 121A which covers the fuel space S from above and tank side walls 121B which cover the fuel space S from left and right sides. The tank outer wall 121 is formed of a single flat plate. The tank upper plate 121A is formed of a bent plate which is bent in an upwardly projecting manner and assumes the highest position at the center thereof in the vehicle widthwise direction so that a vertically spaced-apart distance LA (see FIG. 4) between the tank upper plate 121A and a center plate portion 112A of the tank bottom plate 111 is effectively ensured.

Further, the tank upper plate 121A includes a front upper plate 121C which extends rearwardly at an angle close to the substantially horizontal direction as viewed in a side view; and a rear upper plate 121D which extends rearwardly and downwardly from the front upper plate 121C. The rear upper plate 121D is inclined rearwardly and downwardly by way of a downwardly indented stepped portion thus forming a seat mounting recessed portion 100A where a front portion of the rider's seat 57 enters as shown in FIG. 1. Due to the provision of the seat mounting recessed portion 100A, the rider's seat 57 can be extended over the fuel tank 100, and the rider's seat 57 and the front upper plate 121C of the fuel tank 100 can be arranged contiguously with no stepped portion therebetween (see FIG. 2). Accordingly, a rider can ensure a large amount of movement in the longitudinal direction on the rider's seat 57. Thus, a rider can easily perform the movement of the center of gravity in the longitudinal direction at the time of off-road traveling.

The tank side wall 121B connects the tank upper plate 121A and the tank bottom plate 111 (outer bottom portion 113) to each other, and is arranged with a distance (spaced-apart distance in the vehicle widthwise direction) LB (see FIG. 4) defined between the tank side wall 121B and the straddling bottom portion 112 (side plate portion 112B) of the tank bottom plate 111 in the vehicle widthwise direction. As shown in FIG. 3, the tank side wall 121B bulges outwardly in the vehicle widthwise direction as the tank side wall 121B extends to the front. Due to such a construction, a tank width becomes narrower as the tank extends rearwardly. Thus, a rider who is seated on the rider's seat 57 can easily knee-grip the fuel tank 100.

The above-mentioned fuel tank 100 includes the straddling bottom portion 112 which projects upwardly at the center in the vehicle widthwise direction for straddling the main frame 10. Thus, the fuel tank 100 has a raised bottom at a portion corresponding to the straddling bottom portion 112. Due to such a construction, to use a general-use fuel pump 151 where a fuel suction port is arranged at a position close to a pump body, it is necessary to arrange the fuel pump 151 in the vicinity of the outer bottom portion 113 which forms the deepest portion of the fuel tank 100.

When the structure where the fuel pump 151 is directly mounted on the outer bottom portion 113 is adopted to provide such an arrangement, it is necessary to form a large opening portion which allows the insertion of the fuel pump 151 in the outer bottom portion 113, and it is also necessary to form the outer bottom portion 113 in a flat shape for mounting a flange portion of the fuel pump 151. However, when the outer bottom portion 113 has a narrow width and is not formed into a flat shape as shown in FIG. 2 to FIG. 5, the fuel pump 151 cannot be arranged on the outer bottom portion 113. Accordingly, to arrange the fuel pump 151 on the outer bottom portion 113, it is necessary to form the outer bottom portion 113 in a wide flat shape and this requires a change in shape of the fuel tank 100 leading to the large-sizing of the fuel tank 100.

Therefore, in the construction of this embodiment, the center plate portion 112A of the tank bottom plate 111 is formed into a flat surface having an opening portion (hereinafter, referred to as a first opening portion) 115 which allows the insertion of the fuel pump 151 and a mounting arm 161 which closes the first opening portion 115 by one end thereof and supports the fuel pump 151 by the other end thereof is provided, and the fuel pump 151 is arranged in the vicinity of the outer bottom portion 113 using the mounting arm 161.

Next, the fuel pump mounting structure is explained in detail.

As shown in FIG. 3, the first opening portion 115 for mounting the fuel pump 151 and a second opening portion 116 for mounting a fuel residual amount detection device 171 are formed in the center plate portion 112A of the tank bottom plate 111 in a spaced-apart manner in the longitudinal direction.

The first opening portion 115 is formed in a rear portion of the tank bottom plate 111, and is formed into an elongated hole shape where a longitudinal size is set larger than a widthwise size. The longitudinal size of the first opening portion 115 is set larger than a total length of the fuel pump 151 (a length of the fuel pump 151 along a longitudinal axis J1 (see FIG. 2)), and the lateral size of the first opening portion 115 is set larger than a width (diameter) of the fuel pump 151 so that the fuel pump 151 can be put into or taken away from the fuel tank 100 through the first opening portion 115.

The mounting arm 161 includes a flange portion 162 which closes the first opening portion 115 on one end thereof, and a cylindrical pump support portion 163 which supports the fuel pump 151 on the other end thereof. The flange portion 162 and the pump support portion 163 are connected to each other by an inversely U-shaped bent arm 164 which is bent in an upwardly projecting manner as viewed in a front view.

The bent arm 164 is made of a rigid material such as a synthetic resin and, as shown in the drawing, is formed into a recessed shape in cross section indented rearwardly and downwardly as viewed in a side cross-sectional view, and extends linearly toward the outside in the vehicle widthwise direction (toward the left side in the construction in this embodiment) as viewed in a plan view (a bottom plan view) as shown in FIG. 3.

The bent arm 164 includes, as integral parts thereof, a proximal end arm portion 164A which extends obliquely in the upward direction toward the outside (left side) in the vehicle widthwise direction from the flange portion 162, an intermediate arm portion 164B which extends horizontally toward the outside (left side) in the vehicle widthwise direction from a vehicle-widthwise outer end portion (left end portion) of the proximal end arm portion 164A, and a distal end arm portion 164C which extends obliquely in the downward direction toward the outside (left side) in the vehicle widthwise direction from a vehicle-widthwise outer end portion (left end portion) of the intermediate arm portion 164B. A pump support portion 163 is integrally formed on a distal end of the distal end arm portion 164C.

In the construction of this embodiment, as shown in FIG. 4, the bent arm 164 is formed into a bent shape where the proximal end arm portion 164A extends upwardly to a position close to a rear upper plate 121D of the tank upper plate 121A from the flange portion 162. Thereafter, the intermediate arm portion 164B and the distal end arm portion 164C are bent along a left side surface of the rear upper plate 121D, and the pump support portion 163 is supported in a gap SA formed between the straddling bottom portion 112 of the tank bottom plate 111 and the tank side wall 121B.

More specifically, the bent arm 164 extends upwardly from the flange portion 162 and, thereafter, is bent along an inner surface of a left half body of the tank outer wall 121 (tank upper plate 121A) in the vehicle widthwise direction. Due to such a construction, by inserting the pump support portion 163 of the bent arm 164 into the inside of the fuel tank 100 from the first opening portion 115 and, thereafter, by moving the pump support portion 163 along the inner surface of the tank outer wall 121 (tank upper plate 121A), the pump support portion 163 can be arranged in the gap SA formed between the straddling bottom portion 112 and the tank side wall 121B without being brought into contact with the fuel tank 100.

As described above, in the construction of this embodiment, the first opening portion 115 is the opening through which the fuel pump 151 can be put into or taken away from the fuel tank 100, and the mounting arm 161 can be put into or taken away from the fuel tank 100 through the first opening portion 115 in a state where the fuel pump 151 is supported on the pump support portion 163 of the mounting arm 161. Further, by fixing the flange portion 162 to the tank bottom plate 111 by means of a plurality of fastening members 135 in a state where the mounting arm 161 is put into the inside of the fuel tank 100, the fuel pump 151 can be positioned in the gap SA formed between the straddling bottom portion 112 and the tank side wall 121B.

As shown in FIG. 2 and FIG. 4, the fuel pump 151 is supported in a floating manner in the inside of the above-mentioned gap SA at the rear portion of the fuel tank which constitutes the tank deepest portion of the fuel tank 100 while forming a gap between the fuel pump 151 and the tank bottom plate 111 and a gap between the fuel pump 151 and the tank outer wall 121.

In this case, a longitudinal axis J1 of the fuel pump 151 is coaxial with an axis of the pump support portion 163, and the axis extends along the longitudinal direction of the vehicle body and is inclined rearwardly and downwardly. Accordingly, by arranging the fuel pump 151 close to the outer bottom portion 113 which constitutes the tank deepest portion by lowering a rear lower end of the fuel pump 151, fuel in the tank deepest portion can be surely sucked from a fuel suction port not shown in the drawing which is mounted on the rear lower end of the fuel pump 151.

Further, in the construction of this embodiment, as shown in FIG. 4, a recessed portion 112C which is indented inwardly in the vehicle widthwise direction of the straddling bottom portion 112 is formed. Due to the recessed portion 112C, the above-mentioned gap SA can be widened inwardly in the vehicle widthwise direction thus ensuring an arrangement space for the fuel pump 151 without expanding the fuel tank outwardly in the vehicle widthwise direction.

Further, the axis of the pump support portion 163 (=longitudinal axis J1) is aligned with the indenting direction of a recessed portion 164D of the bent arm 164 (see FIG. 2) which is indented in the rearward and downward direction. Accordingly, at the time of integrally forming the pump support portion 163 and the bent arm 164 by molding, the mold removing direction of the pump support portion 163 and the mold removing direction of the bent arm 164 agree with each other thus facilitating the forming of these parts.

Further, a group of pipes (including wires) including the fuel feed pipe 152 and a fuel return pipe 153 which extend from the fuel pump 151 is stored in this recessed portion 164D, and the group of pipes is pulled out to the outside through the recessed portion 164D and the flange portion 162. Due to such a construction, the fuel feed pipe 152 can be connected to the injector 8A so that fuel fed from the fuel pump 151 can be supplied to the injector 8A.

Further, in the construction of this embodiment, as shown in FIG. 5, the first opening portion 115 is offset to a side (a right side) opposite to the fuel pump 151 with respect to the widthwise center L1 (=widthwise center of L0) of the fuel tank 100, and the second opening portion 116 is formed in a state where the center of the second opening portion 116 agrees with the widthwise center L1 of the fuel tank 100. By offsetting the first opening portion 115 to the side opposite to the fuel pump 151, an arm length of the mounting arm 161 can be elongated while ensuring the mountability of the mounting arm 161. Thus, the arm can be easily extended to an area in the vicinity of the tank bottom plate 111.

Next, the fuel residual amount detection device 171 is explained.

The fuel residual amount detection device 171 is a device that is arranged in the inside of the fuel tank 100 and detects a residual amount of fuel. As shown in FIG. 2 and FIG. 3, the fuel residual amount detection device 171 includes a flange portion 172 that closes the second opening portion 116 and a residual amount sensor 173 that is mounted on the flange portion 172. In the fuel residual amount detection device 171, the flange portion 172 is fixed to the tank bottom plate 111 by a plurality of fastening members 136 (see FIG. 3). Thus, the residual amount sensor 173 is fixed to the inside of a front portion of the fuel tank 100 whereby a fuel residual amount can be detected by the residual amount sensor 173.

As shown in FIG. 2, the residual amount sensor 173 includes a rotary shaft 173A that projects outwardly (leftwardly) in the vehicle widthwise direction, a float support arm 173B that is fixed to the rotary shaft 173A, and a float 173C that is fixed to a distal end of the float support arm 173B. The float support arm 173B is swung in the vertical direction corresponding to a level of liquid surface of fuel due to the float 173C so that the residual amount sensor 173 can detect a fuel residual amount.

In FIG. 2, the highest position and the lowest position of the float 173C are indicated by a chain double-dashed line. In the construction of this embodiment, the fuel residual amount detection device 171 which includes the float 173C is arranged in the inside of the front space of the fuel tank 100, and the fuel pump 151 and the mounting arm 161 are arranged in the inside of the rear space of the fuel tank 100. Thus, respective parts can be efficiently arranged in the front space and the rear space formed by dividing the space in the inside of the fuel tank 100 respectively.

As has been explained heretofore, according to this embodiment, the first opening portion 115 is formed in the tank bottom plate 111 of the fuel tank 100, and the mounting arm 161 which closes the first opening portion 115 by one end thereof and supports the fuel pump 151 by the other end thereof is arranged in the inside of the fuel tank 100, the mounting arm 161 extends along the vehicle widthwise direction toward the gap SA formed between the straddling bottom portion 112 of the fuel tank 100 which straddles the main frame 10 and the tank side wall 121B, and supports the fuel pump 151 in the inside of the gap SA. Accordingly, compared to a case where the fuel pump 151 is directly mounted on the tank bottom plate 111, there is no restriction such as the restriction where it is necessary to form a large opening in the tank deepest portion of the tank bottom plate 111 or the restriction where it is necessary to form a flat portion on the tank bottom plate 111. Thus, the first opening portion 115 can be formed in the straddling bottom portion 112 where a flat portion can be easily ensured. Accordingly, by adopting the construction where the fuel pump 151 is arranged in the inside of the saddle-type fuel tank 100 which straddles the main frame 10, the degree of freedom in shape of the fuel tank 100 can be enhanced and large-sizing of the fuel tank 100 can be also obviated.

Further, the motorcycle 1 having the above-mentioned construction is an off-road-type motorcycle in which the rider's seat 57 is arranged behind the fuel tank 100, and the rear upper plate (rear upper surface) 121D of the fuel tank 100 is inclined rearwardly and downwardly thus forming the seat mounting recessed portion 100A in which the front portion of the rider's seat 57 enters. Thus, the rear space of the fuel tank 100 is narrowed and, further, the rear bottom surface of the fuel tank 100 is formed lower than the front bottom surface of the fuel tank 100. Accordingly, there exists a restriction that it is necessary to arrange the fuel pump 151 in the narrow rear space from a viewpoint of fuel suction property.

In this construction, under such a restriction, as shown in FIG. 2, the fuel pump 151 can be supported by the mounting arm 161 below the seat mounting recessed portion 100A while enhancing the degree of freedom in the shape of the fuel tank 100 and preventing the fuel tank 100 from becoming large-sized. Accordingly, the fuel pump 151 can be arranged in the narrow rear space of the above-mentioned off-road type vehicle compactly while ensuring fuel suction property.

Further, in this construction, the mounting arm 161 has the flange portion 162 that closes the first opening portion 115 at one end thereof, and the pump support portion 163 that supports the fuel pump 151 at the other end thereof. The flange portion 162 and the pump support portion 163 are connected to each other by the bent arm 164 which is bent in an upwardly projecting manner as viewed in a front view. Accordingly, the structure of the mounting arm 161 becomes simple. Thus, the mounting arm 161 can be easily manufactured.

Further, the first opening portion 115 is formed in the straddling bottom portion 112 of the fuel tank 100, and the mounting arm 161 extends upwardly from the first opening portion 115 and, thereafter, is bent toward the gap SA along the tank outer wall 121. Accordingly, the fuel pump 151 can be easily moved to the gap SA by moving the mounting arm 161 along the tank outer wall 121. Thus, a mounting and removal operation of the fuel pump 151 and the mounting arm 161 can be easily performed.

Further, the fuel pump 151 is positioned below one end of the mounting arm 161, and is supported in a state where the longitudinal axis J1 of the fuel pump 151 extends in a rearwardly and downwardly inclined manner along the longitudinal direction of the vehicle body. Accordingly, a widthwise space necessary for the arrangement of the fuel pump 151 can be made small. Thus, the fuel pump 151 can be arranged compactly. Further, the rear lower portion of the fuel pump 151 can be arranged close to the tank bottom plate 111. Thus, it is possible to allow the fuel pump 151 to take the pump arrangement suitable for the fuel tank 100 where the rear lower portion of the fuel tank forms the tank deepest portion.

Further, the mounting arm 161 is formed into a recessed shape in cross section indented rearwardly and downwardly, and the group of pipes that include the fuel feed pipe 152 that is connected to the fuel pump 151 is housed in the inside of the recessed portion 164D formed by the recessed shape in cross section. Accordingly, the fuel feed pipe 152 can be held without using a dedicated support member. Further, the recessed portion 164D is configured to also function as a reserve cup for temporarily reserving fuel that tends to flow from either one side of the left and right sides of the fuel tank 100 to the other side of the fuel tank 100 when the vehicle body turns, and the recessed portion 164D can rapidly return fuel to an original position when the vehicle body stops turning.

The first opening portion 115 of the fuel tank 100 is offset to a side opposite to the fuel pump 151 with respect to the widthwise center L1 of the fuel tank 100. Thus, the arm can be elongated while ensuring the mountability of the mounting arm 161.

Further, the first opening portion 115 is formed into an elongated hole shape where a longitudinal size is set larger than a widthwise size. Thus, the fuel pump 151 can be easily inserted into the space in the longitudinal direction thus facilitating the mounting operation of the fuel pump 151.

The above-mentioned embodiment merely shows one mode of the present invention, and desired modifications and applications are conceivable without departing from the gist of the present invention.

For example, in the above-mentioned embodiment, the explanation is made with respect to a case where the present invention is applied to the fuel pump mounting structure of an off-road-type vehicle shown in FIG. 1 and the like. However, the present invention is not limited to such a case, and is widely applicable to a saddle-ride-type vehicle such as a motorcycle except for the off-road-type vehicle. Here, the saddle-ride-type vehicle includes general vehicles that a rider rides on a vehicle body in a straddling manner, and is a vehicle including not only a motorcycle (including a bicycle with prime mover) but also a three-wheeled vehicle and a four-wheeled vehicle that are classified into an ATV (all-terrain vehicle).

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A fuel pump mounting structure of a saddle-ride vehicle comprising:
   a vehicle body frame having a main frame which extending rearwardly;
   a saddle-type fuel tank mounted on the main frame in a state where the fuel tank straddles the main frame; and
   a fuel pump arranged in the inside of the fuel tank,
   wherein an opening portion is formed in a bottom plate of the fuel tank, and a mounting arm for closing the opening portion by one end thereof and for supporting the fuel pump by the other end thereof is arranged in the inside of the fuel tank,
   wherein the mounting arm extends along a vehicle widthwise direction toward a gap formed between a straddling bottom portion of the fuel tank which straddles the main frame and a side wall of the fuel tank, and supports the fuel pump in the inside of the gap, and
   wherein a recess is indented into a front side wall of the mounting arm and faces toward a front of the vehicle, and a fuel feed pipe connected to the fuel pump is housed inside the recess.

2. The fuel pump mounting structure of a saddle-ride vehicle according to claim 1, wherein the mounting arm has a flange portion for closing the opening portion at the one end thereof, and a pump support portion for supporting the fuel pump at the other end thereof, and the flange portion and the pump support portion are connected to each other by a bent arm which is bent in an upwardly projecting manner as viewed in a front view.

3. The fuel pump mounting structure of a saddle-ride vehicle according to claim 2, wherein the opening portion is formed in the straddling bottom portion, and
   the mounting arm extends upwardly from the opening portion and, thereafter, is bent toward the gap along an outer wall of the fuel tank.

4. The fuel pump mounting structure of a saddle-ride vehicle according to claim 2, wherein the fuel pump is positioned below one end of the mounting arm, and is supported in a state where a longitudinal axis of the fuel pump extends in a rearwardly and downwardly inclined manner along a longitudinal direction of a vehicle body.

5. The fuel pump mounting structure of a saddle-ride vehicle according to claim 2, wherein the opening portion of the fuel tank is offset to a side opposite to the fuel pump with respect to the widthwise center of the fuel tank.

6. The fuel pump mounting structure of a saddle-ride vehicle according to claim 2, wherein a rider's seat is provided behind the fuel tank, and
   an upper surface of a rear portion of the fuel tank is inclined rearwardly and downwardly thus forming a seat mounting recessed portion wherein a front portion of the rider's seat enters, a bottom surface of a rear portion of the fuel tank is formed low compared to a bottom surface of a front portion of the fuel tank, and the mounting arm supports the fuel pump below the seat mounting recessed portion.

7. The fuel pump mounting structure of a saddle-ride vehicle according to claim 2, wherein the opening portion of the fuel tank is formed into an elongated hole shape where a longitudinal size is set larger than a widthwise size.

8. The fuel pump mounting structure of a saddle-ride vehicle according to claim 1, wherein the opening portion is formed in the straddling bottom portion, and
   the mounting arm extends upwardly from the opening portion and, thereafter, is bent toward the gap along an outer wall of the fuel tank.

9. The fuel pump mounting structure of a saddle-ride vehicle according to claim 8, wherein the fuel pump is positioned below one end of the mounting arm, and is supported in a state where a longitudinal axis of the fuel pump extends in a rearwardly and downwardly inclined manner along a longitudinal direction of a vehicle body.

10. The fuel pump mounting structure of a saddle-ride vehicle according to claim 1, wherein the fuel pump is positioned below one end of the mounting arm, and is supported in a state where a longitudinal axis of the fuel pump extends in a rearwardly and downwardly inclined manner along a longitudinal direction of a vehicle body.

11. The fuel pump mounting structure of a saddle-ride vehicle according to claim 1, wherein the opening portion of the fuel tank is offset to a side opposite to the fuel pump with respect to the widthwise center of the fuel tank.

12. The fuel pump mounting structure of a saddle-ride vehicle according to claim 1, wherein a rider's seat is provided behind the fuel tank, and
   an upper surface of a rear portion of the fuel tank is inclined rearwardly and downwardly thus forming a seat mounting recessed portion wherein a front portion of the rider's seat enters, a bottom surface of a rear portion of the fuel tank is formed low compared to a bottom surface of a front portion of the fuel tank, and the mounting arm supports the fuel pump below the seat mounting recessed portion.

13. The fuel pump mounting structure of a saddle-ride vehicle according to claim 1, wherein the opening portion of the fuel tank is formed into an elongated hole shape where a longitudinal size is set larger than a widthwise size.

14. A fuel pump mounting structure of a saddle-ride vehicle comprising:
   a fuel tank mounted on the main frame in a state wherein the fuel tank straddles a main frame; and
   a fuel pump arranged in the inside of the fuel tank;
   an opening portion formed in a bottom plate of the fuel tank; and
   a mounting arm having one end for closing the opening portion and a second end for supporting the fuel pump,
   wherein said mounting arm extends along a vehicle widthwise direction toward a gap formed between a straddling bottom portion of the fuel tank for straddling the main frame and a side wall of the fuel tank for supporting the fuel pump in the inside of the gap, and
   wherein a recess is indented into a front side wall of the mounting arm and faces toward a front of the vehicle, and a fuel feed pipe connected to the fuel pump is housed inside the recess.

15. The fuel pump mounting structure of a saddle-ride vehicle according to claim 14, wherein the mounting arm has a flange portion for closing the opening portion at the one end thereof, and a pump support portion for supporting the fuel pump at the second end thereof, said flange portion and the pump support portion are connected to each other by a bent arm which is bent in an upwardly projecting manner as viewed in a front view.

16. The fuel pump mounting structure of a saddle-ride vehicle according to claim 14, wherein the opening portion is formed in the straddling bottom portion, and
   the mounting arm extends upwardly from the opening portion and, thereafter, is bent toward the gap along an outer wall of the fuel tank.

* * * * *